Patented Mar. 12, 1935

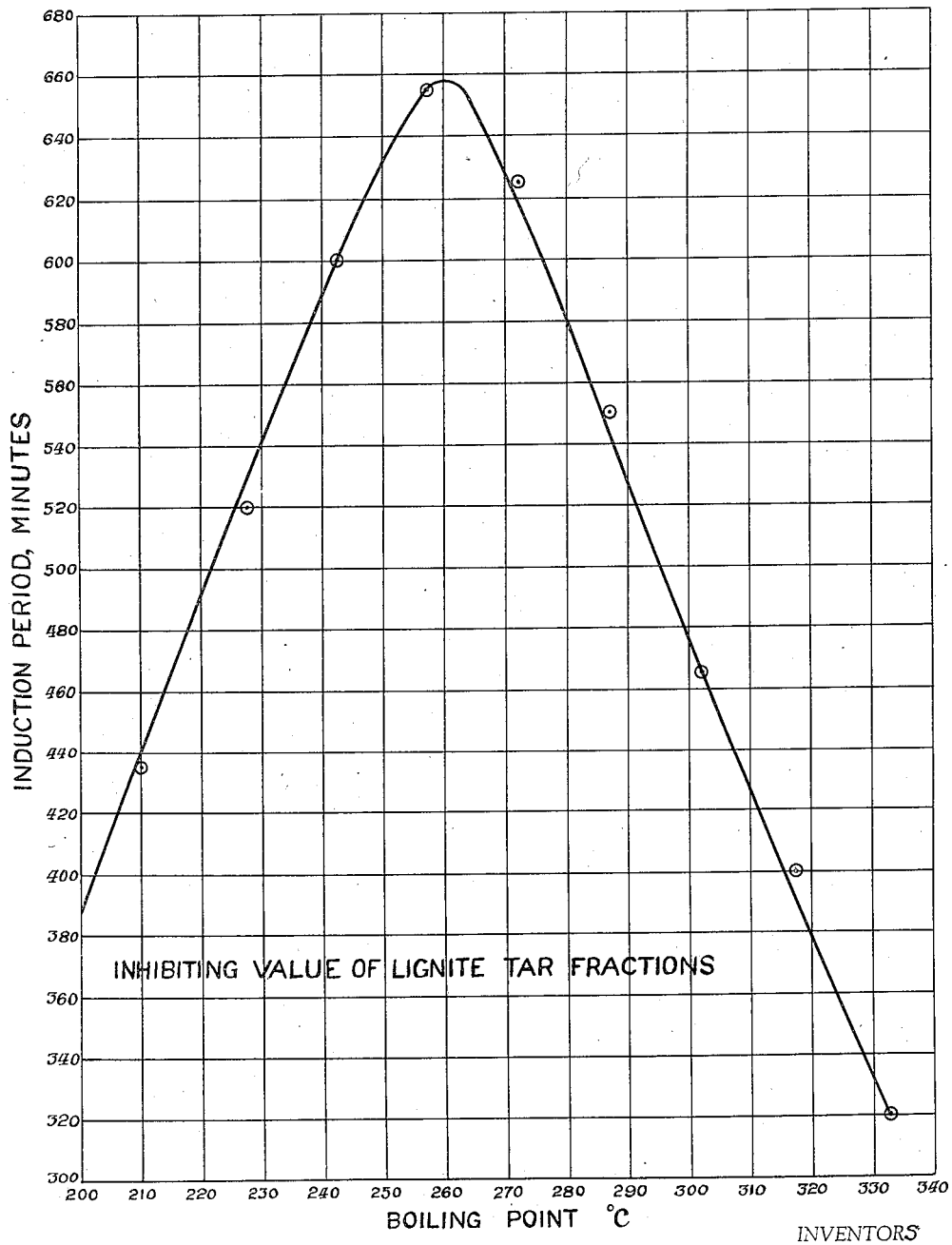

1,993,941

UNITED STATES PATENT OFFICE 1,993,941

TREATMENT OF MOTOR FUEL

Jacque C. Morrell and Charles G. Dryer, Chicago, Ill., assignors to Universal Oil Products Company, Chicago, Ill., a corporation of Delaware Application July 7, 1933, Serial No. 679,318
Renewed January 18, 1935

8 Claims. (Cl. 44—9)

This invention refers more particularly to the treatment of cracked distillates of gasoline boiling range or those containing a substantial proportion of gasoline, such distillates being generally characterized by a good anti-knock rating.

More specifically the invention has reference to processes of treatment whereby the deterioration of such fuels on storage with respect to gum formation, and particularly anti-knock value, is substantially prevented, under the varying influence of light, air, etc., to which they are subjected.

Prior to the advent of the cracking process as a factor in the trade, the straight run gasolines produced either by simple distillation from crudes or by absorption from casinghead gases were of an essentially saturated character, containing only negligible amounts of olefinic and cyclic hydrocarbons so that they underwent substantially no change when stored for long periods of time, particularly if reasonably protected from the influence of light and air.

When cracked gasolines became an important factor in the trade it was found that their more unsaturated olefinic constituents such as the di and tri olefins were characterized by a tendency to deposit gummy or resinous materials upon standing, particularly under the influence of light and air, and were objectionable constituents on account of this gum-forming tendency as well as on account of their loss as possible anti-knock material due to the gum-forming or polymerization reactions. During the gum-forming period in the storage of cracked gasoline a yellow to brown color sometimes develops.

The present invention is directed to preventing the formation of these undesirable gums and colored compounds and the reduction in knock rating of the motor fuel, although it is to be particularly pointed out that gum and color formation and reduction in anti-knock value are not necessarily related and that the accomplishment of the two objects may not be brought about simultaneously, that is, they may be independent of each other.

Inhibitors are to be distinguished from anti-knock agents in that the true anti-knock agent modifies the combustion of fuel in an internal combustion engine cylinder but does not necessarily prevent the development of undesirable characteristics under storage. In fact, numerous known anti-knock agents are themselves unstable in storage and the gasoline to which they are added needs further additions of true inhibitors to stabilize the increased anti-knock value produced by the addition of the anti-knock agent. Furthermore, it is usually necessary to use much higher percentages of reagent to prevent knocking than is necessary in inhibiting deterioration and depreciation of the gasoline so that it will be seen that in the great majority of cases the action of anti-knock agents is distinct from that of true inhibitors, the use of which constitutes the present invention.

In one specific embodiment the present invention comprises the use of selected tar fractions produced in the distillation of lignites as inhibitors for preventing the deterioration of the quality of gasolines on storage.

The base substances used for producing the inhibitors characteristic of the present invention may be generally classified as the natural deposits of carbonaceous material of lower fuel value than coal, and are supposed to represent an earlier geological stage in the formation of the latter. Their liquid distillation products are of a more or less specific character due to the inherent characteristics of the lignite itself and may consist of varying quantities of fixed gases such as methane and ammonia, neutral hydrocarbons of the different known series such as the paraffins, unsaturates, aromatics, etc., and numerous hydrocarbon derivatives containing oxygen, nitrogen and sulphur.

We have found that the inhibiting value of lignite tar fractions produced in the primary distillation of the lignite and more particularly upon the redistillation of the primary tar pass through definite maxima corresponding to some given boiling point depending upon the particular lignites from which the tars are produced and the conditions of distillation as to whether moderate or extensive decomposition reactions take place.

The invention, therefore, comprises the use of highly effective inhibiting agents which are more readily obtainable and cheaper than individually separated or synthetically produced individual chemical compounds. Furthermore, there are undoubtedly compounds present of a complicated chemical nature and of high molecular weight whose exact constitution is difficult of determination but which undoubtedly exert a beneficial influence upon the total inhibiting effect of the mixture in which they are present as will be shown by later examples. In some tar fractions of the character under consideration the presence of undesirable amounts of heavy tars which would result in producing color in the gasoline to which they are added may necessitate a preliminary extraction of the alkali and/or acid-soluble inhibiting constituents from the heavy tars, the use of such preliminary steps being comprised within the scope of the invention.

The selection of a lignite tar fraction for use in preventing the deterioration of any given gasoline on storage will be determined by consideration of a large number of factors. Primarily, the chemical composition of cracked and straight-run gasolines from different sources will vary markedly in respect to the percentages of those classes of compounds which require stabilization by the use of inhibitors. For example, when cracked gasolines are produced under relatively high temperatures and low superatmospheric pressures by processes currently known as "vapor phase" cracking processes, the percentages of di and tri olefins may be relatively high, resulting in a pronounced tendency toward polymerization with attendant depreciation in value of the gasoline stock. In such cases more highly efficient tar fractions may be used, and percentages of the order of from possibly 0.01 to 0.2%. When more nearly saturated gasolines are produced from intermediate petroleum distillates of a relatively saturated character and under higher superatmospheric pressure and lower temperatures, either smaller amounts of the more efficient tar fractions or the same amounts of relatively less efficient may suffice to effect the required stabilization of properties. In most cases the proper selection will be readily made by a few experiments and present no unusual difficulties.

The addition to a gasoline of the particular type of tar fraction covered by the present invention may be accomplished in several ways. The tar may be dissolved in a gasoline or other solvent such as, for example, benzol, to make a relatively concentrated solution (this sometimes serving to eliminate heavy insoluble pitches of low inhibiting value) and the solution may then be added to the gasoline in proper quantities to insure the presence of the necessary percentage of inhibitor. In perhaps the simplest case the tar fractions may be added directly to storage tanks containing unstable gasolines, the addition being followed by mechanical agitation or circulation of the tank contents to insure a thorough distribution. It is generally preferable, in the case of cracked distillates which are to receive no other chemical treatment, to add the inhibiting fraction as soon as possible after the distillate is condensed, to prevent the development of oxygen addition compounds which seem in many cases to catalyze the extensive polymerization reactions which result in the formation of gums and colored materials. In the case of distillates which receive a light acid treatment or caustic wash, the inhibitor is preferably added as soon as possible after the treatment is completed.

The following data are presented as an example of the results obtainable in inhibiting the deterioration of a cracked gasoline by the use of selected lignite tar fractions according to the invention. The gasoline in which the fractions were used was a blend of straight run and cracked gasolines corresponding to the production from a mid-continent crude and had an induction period in the oxygen bomb test of 130 minutes, this period being defined as the time preceding a measurable rate of oxygen absorption in the currently used bomb test. In each case 0.01% by weight of inhibitor was used in the gasoline.

*Selected fractions from North Dakota lignite tar*

| | Percent of fraction | Induction period, minutes |
|---|---|---|
| Entire oil | | 525 |
| Cut 200–220° C | 3.4 | 435 |
| 220–235° C | 10.8 | 520 |
| 235–250° C | 16.3 | 600 |
| 250–265° C | 17.9 | 655 |
| 265–280° C | 13.2 | 625 |
| 280–295° C | 8.7 | 550 |
| 295–310° C | 6.2 | 465 |
| 310–325° C | 5.9 | 410 |
| 325–340° C | 7.6 | 320 |

The data shown in the table is also indicated graphically in the attached curve and shows that the inhibiting value passes through a maximum corresponding to a fraction boiling at about 260° C., and that fractions from 235 to 295° C., are all above the inhibiting value of the original tar from which they were produced. These particular fractions constitute 56.1% by weight of the whole tar and in admixture have an inhibiting value corresponding to an induction period of 610 minutes.

The features of the invention are evident from a consideration of the foregoing specification and numerical data introduced to illustrate the results obtainable in one specific instance but neither is to be construed as imposing undue limitations upon the scope of the invention.

We claim as our invention:

1. A process for preventing or substantially reducing deterioration of hydrocarbon motor fuel containing gum-forming unsaturates, which comprises adding to the motor fuel a small amount of a lignite tar fraction.

2. A process for preventing or substantially reducing deterioration of hydrocarbon motor fuel containing gum-forming unsaturates, which comprises adding to the motor fuel a small amount of an oily distillate of lignite tar.

3. A process for preventing or substantially reducing deterioration of hydrocarbon motor fuel containing gum-forming unsaturates, which comprises adding to the motor fuel a small amount of lignite tar distillate boiling between 200° C. and 300° C.

4. A process for preventing or substantially reducing deterioration of hydrocarbon motor fuel containing gum-forming unsaturates, which comprises adding to the motor fuel a small amount of lignite tar distillate boiling between 230° C. and 280° C.

5. Motor fuel comprising gasoline containing gum-forming unsaturates and to which has been added a small amount of a lignite tar fraction.

6. Motor fuel comprising gasoline containing gum-forming unsaturates and to which has been added a small amount of an oily distillate of lignite tar.

7. Motor fuel comprising gasoline containing gum-forming unsaturates and to which has been added a small amount of a lignite tar distillate boiling between 200° C. and 300° C.

8. Motor fuel comprising gasoline containing gum-forming unsaturates and to which has been added a small amount of a lignite tar distillate boiling between 230° and 280° C.

JACQUE C. MORRELL.
CHARLES G. DRYER.